US 12,395,208 B2

United States Patent
Radunovic et al.

(10) Patent No.: US 12,395,208 B2
(45) Date of Patent: Aug. 19, 2025

(54) REAL-TIME RADIO INTELLIGENT CONTROLLER

(71) Applicant: Microsoft Technology Licensing, LLC, Redmond, WA (US)

(72) Inventors: Bozidar Radunovic, Cambridge (GB); Daehyeok Kim, Redmond, WA (US); Ganesh Ananthanarayanan, Samamish, WA (US); Xenofon Foukas, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 18/334,147

(22) Filed: Jun. 13, 2023

(65) Prior Publication Data
US 2024/0421859 A1    Dec. 19, 2024

(51) Int. Cl.
  *H04B 7/04* (2017.01)
  *G06F 8/656* (2018.01)

(52) U.S. Cl.
  CPC ......... *H04B 7/04013* (2023.05); *G06F 8/656* (2018.02)

(58) Field of Classification Search
  CPC .... H04B 7/04013; H04H 60/87; H04H 60/88; H04H 60/89; H04W 52/0203; H04W 52/0206; H04W 88/08
  USPC ......... 375/259–262, 265, 267; 370/235, 236, 370/253, 349, 350, 392; 709/201, 203
  See application file for complete search history.

(56) References Cited

U.S. PATENT DOCUMENTS

| | | | |
|---|---|---|---|
| 2020/0213820 A1* | 7/2020 | Sim | H04L 61/4541 |
| 2020/0383115 A1* | 12/2020 | Kim | H04W 24/02 |
| 2021/0258969 A1* | 8/2021 | Yang | H04W 72/54 |
| 2021/0289385 A1* | 9/2021 | Roessler | G06F 9/5061 |
| 2022/0377615 A1* | 11/2022 | Radunovic | G06F 11/3428 |
| 2023/0209555 A1* | 6/2023 | Sosnin | H04L 5/0053 370/329 |

(Continued)

OTHER PUBLICATIONS

"Feasibility of Open-Source for 5G", Telecommunications Standards Development Society, India (TSDSI), Retrieved from the Internet: URL: https://tsdsi.in/wp-content/uploads/2020/09/Open-Source-White-Paper.pdf, Jul. 2021, 128 pages.

(Continued)

Primary Examiner — Young T. Tse
(74) Attorney, Agent, or Firm — ArentFox Schiff LLP

(57) ABSTRACT

A real-time radio intelligent controller (RIC) executes in parallel with one or more virtual radio access network functions to provide real-time analytics and control of the virtual radio access network functions. At least a first processor core is configured to execute a radio network virtual function. The radio network virtual function is configured with a codelet to output selected operational data to a first stream associated with a first stream ID and receive control information from a control stream associated with a second stream ID. At least a second processor core is configured to execute the real-time RIC isolated from the at least the first processor core. The real-time RIC includes one or more dynamically loaded programs configured to: access the first stream; perform processing on the operational data; and write commands for the radio network virtual function to the control stream.

23 Claims, 6 Drawing Sheets

(56) References Cited

U.S. PATENT DOCUMENTS

2023/0284301 A1\* 9/2023 Cui .................... H04W 76/15
                                                        370/329
2023/0413111 A1\* 12/2023 Kotaru ............. H04W 28/0858

OTHER PUBLICATIONS

Foukas, et al., "Taking 5G RAN Analytics and Control to a New Level", Retrieved from the Internet: URL: https://www.microsoft.com/en-us/research/uploads/prod/2022/12/JanusTechnicalReport.pdf, Dec. 12, 2022, 18 pages.
International Search Report and Written Opinion received for PCT Application No. PCT/US2024/032181, mailed on Sep. 25, 2024, 15 pages.

\* cited by examiner

| streamID | Source Address | Destination Address | Encoding | Schema |
|---|---|---|---|---|
| 054ab6 ... | * | EventHub | ENC | protobuf1 |
| 054ab6 ... | * | nRT-RIC/App1 | ENC | protobuf1 |
| 078f4e ... | Codelet/0ac5634 | RT-RIC/78e4cf | NONE | N/A |
| 67ef33 ... | RTRIC/78e4cf | Codelet/0ac5634 | NONE | N/A |

Figure 3

REAL-TIME RADIO INTELLIGENT CONTROLLER

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize an edge data center with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various remote units (RU), which can provide at least PHY and/or MAC layers of a base station or other RAN node of the mobile network, can be deployed at edge servers. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the edge data center utilizes generic computing resources, a virtualized RAN may provide scalability and fault tolerance for base station processing. For example, the edge data center may assign a variable number of computing resources (e.g., servers) to perform PHY layer processing for the radio units associated with the edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a computing system including: at least a first processor core configured to execute a radio network virtual function, wherein the radio network virtual function is configured with a codelet to output selected operational data to a first stream associated with a first stream ID and receive control information from a control stream associated with a second stream ID; at least a second processor core configured to execute a real time radio intelligent controller isolated from the at least the first processor core, the radio intelligent controller including one or more dynamically loaded programs configured to: subscribe to the first stream; perform processing on the operational data; and write commands for the radio network virtual function to the control stream.

In some aspects, the techniques described herein relate to a method including: executing a radio network virtual function on at least a first processor core, wherein the radio network virtual function is configured with a codelet to output selected operational data to a first stream associated with a first stream ID and receive control information from a control stream associated with a second stream ID; executing a real time radio intelligent controller on at least a second processor core isolated from the at least the first processor core, the radio intelligent controller including one or more dynamically loaded programs; accessing, by a dynamically loaded program, operational data from the first stream; performing processing on the operational data; and writing, by the dynamically loaded program, commands for the radio network virtual function to the control stream.

In some aspects, the techniques described herein relate to a method, wherein executing the radio network virtual function includes loading the codelet into user space of the radio network virtual function as extended Berkeley Packet Filter (eBPF) bytecode via a plurality of hooks in the radio network virtual function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 3 is an example of a routing table for the real-time RIC.

DETAILED DESCRIPTION

Figure 1:
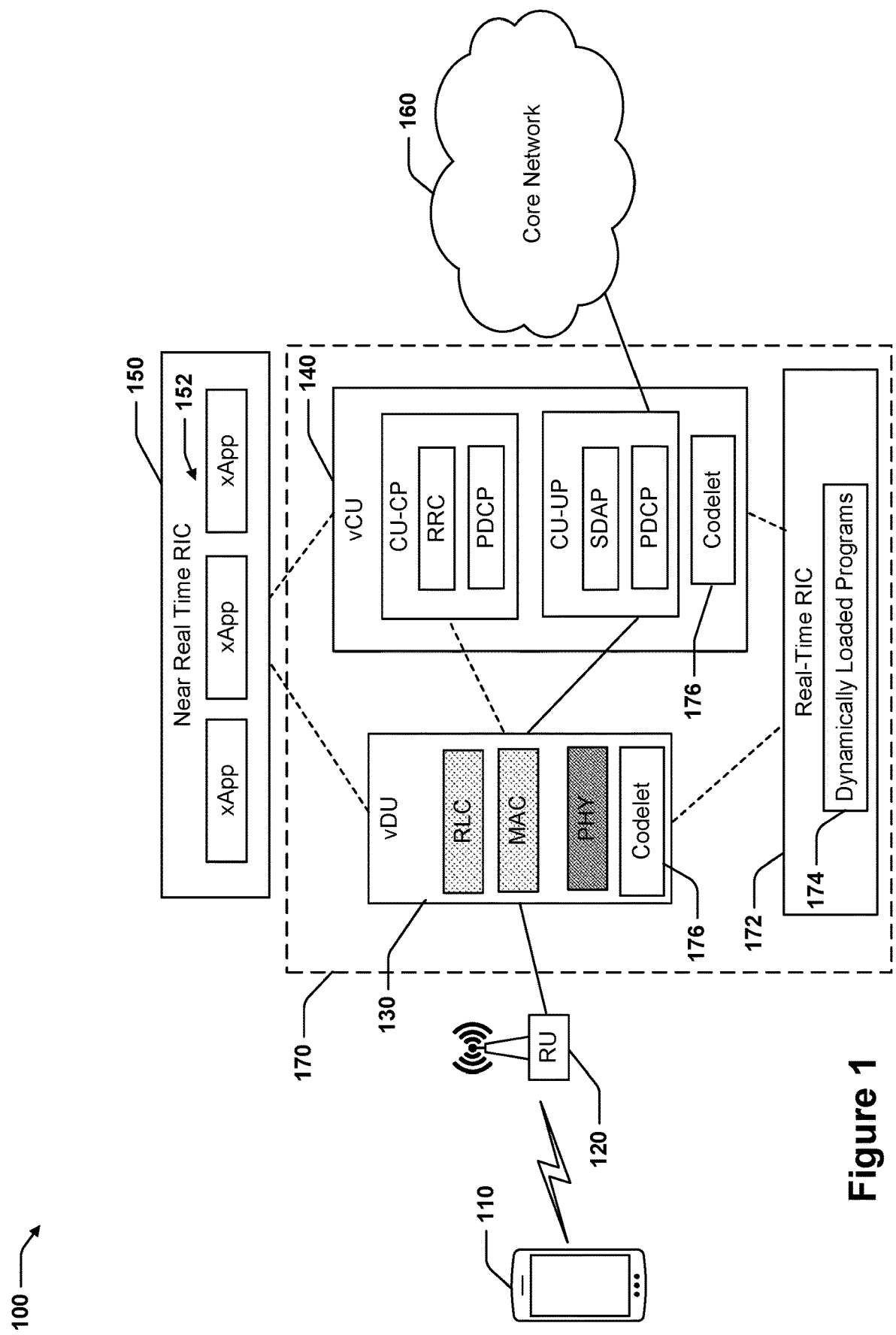
FIG. 1 is a diagram of an example virtualized radio access network (vRAN) connecting a user equipment (UE) to a core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a real-time radio intelligent controller (RIC). The real-time RIC analyzes operational data of one or more radio access network (RAN) virtual functions. The real-time RIC controls the one or more RAN virtual functions by writing to a control stream. The RAN virtual functions may have tight timing controls, for example, on the order of microseconds (u) in order to meet the slot and mini-slot timing of RAN transmissions.

A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

Despite this compelling vision, the opportunity for innovation still largely remains untapped because of two main challenges. The first challenge is related to the flexible data collection for monitoring and telemetry applications. The RAN functions can generate huge volumes of telemetry data at a high frequency (e.g., gigabytes per second). Collecting, transferring, and processing this data can put a strain on compute and network capacity. A conventional approach, standardized by the $3^{rd}$ generation partnership project (3GPP), defines a small set of aggregate cell key performance indicators (KPIs) collected every few seconds or minutes. The O-RAN RIC extends this idea by providing new KPIs at a finer time granularity. The O-RAN RIC may be classified as a near real-time RIC. Each KPI is defined through a service model (a form of API), most of them standardized by O-RAN. However, this approach is slow to evolve and does not scale well because of a limited number of initial use cases and a need to standardize new proposals. The second challenge is due to the real-time nature of many RAN control and data plane operations. Any new functionality added to these operations, in order to support a new service model, must be completed within a deadline, typically ranging from microseconds (µs) to a few milliseconds (ms). A deadline violation may cause performance degradation or even crash a vRAN. Any changes on these critical paths can create substantial design challenges and make RAN vendors reluctant to add new features.

In an aspect, the present disclosure describes a computing system for hosting both RAN virtual functions and a real-time RIC. For example, the computing system may be an edge server or an edge server rack including multiple edge servers. The RAN virtual functions are protected by isolation from the real-time RIC. For example, each RAN virtual function may be executed on a separate processor core from the real-time RIC. The processor core(s) executing the RAN virtual functions are configured with a codelet that outputs selected operational data to a first stream. The codelet is further configured to receive control information from a control stream. The real-time RIC includes one or more dynamically loaded programs that execute in parallel with the RAN virtual functions. The dynamically loaded programs are configured to access the first stream, perform processing on the operational data, and write commands for the RAN virtual functions to the control stream.

The real-time RIC provides great flexibility for the dynamically loaded programs while requiring little modification of the RAN virtual functions by the RAN vendors. For example, the dynamically loaded programs may include complex machine-learning models. Because the dynamically loaded programs are isolated from the RAN virtual functions, timing delays of the dynamically loaded programs will not crash the RAN virtual functions. Further, the codelets for accessing the RAN virtual functions are less intrusive and demanding than conventional service models. For example, a RAN vendor may configure a RAN virtual function with various hook points to allow execution of a codelet including extended Berkeley packet filter (eBPF) bytecode, which can be statically verified prior to loading. As another example, the codelet may be an operating system eBPF probe that executes in kernel space to access function parameters. The operating system eBPF probe can be configured using function calls within the RAN virtual function without modifying the RAN virtual function.

Figure 4:
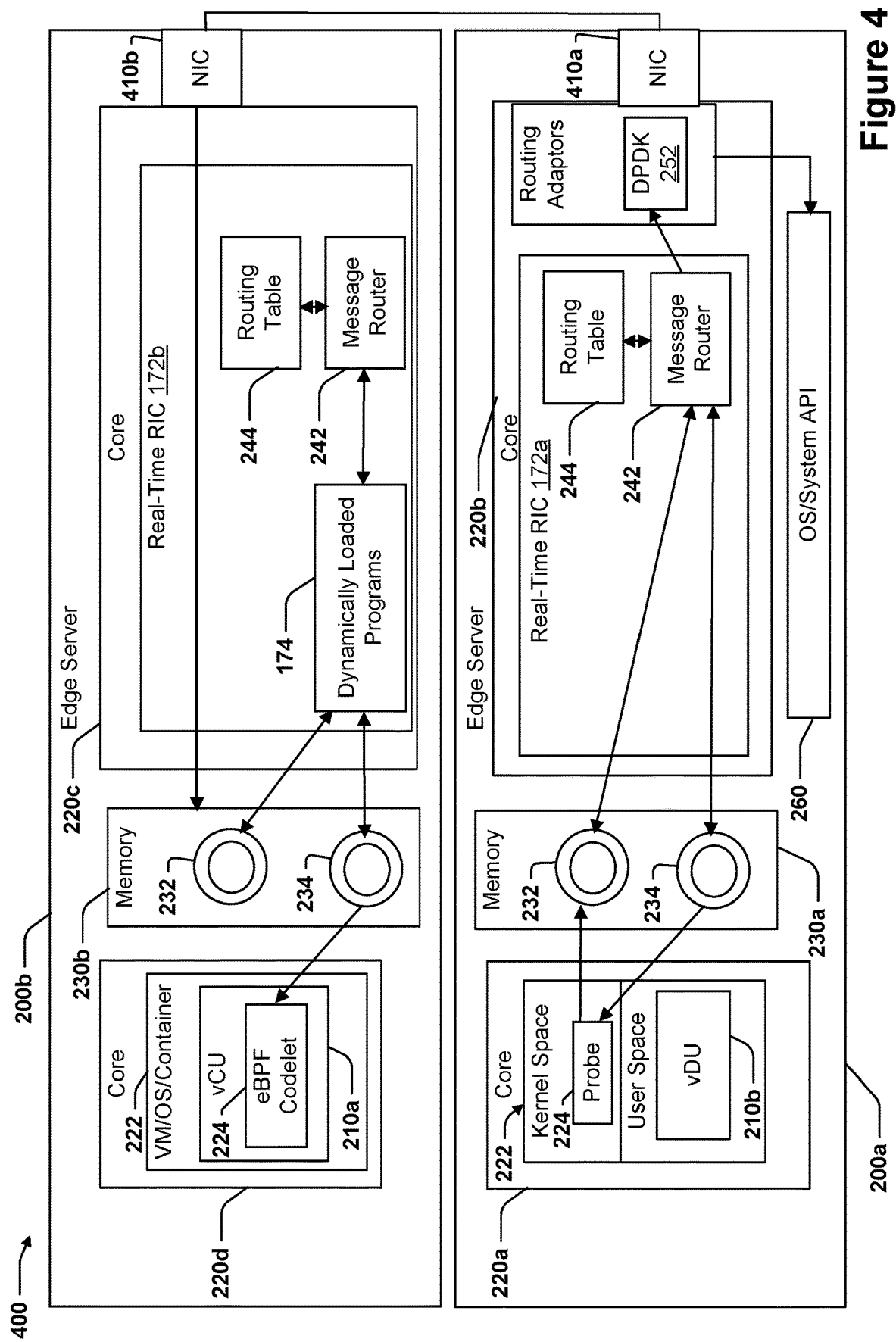
FIG. 4 is a diagram of an example server rack implementing a real-time RIC over multiple servers.
Figure 5:
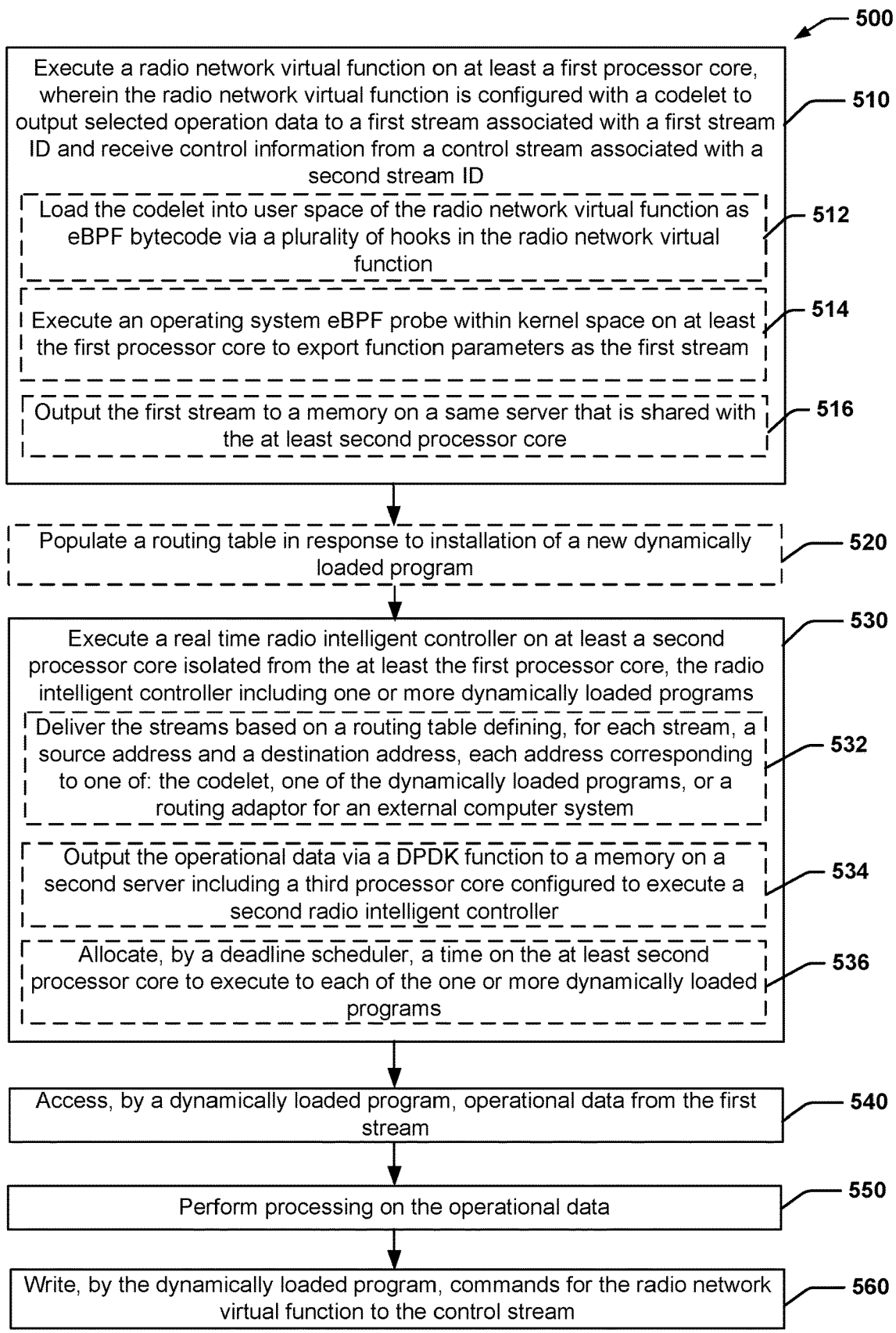
FIG. 5 is a flow diagram of an example of a method for executing applications using operational data of a radio access network virtual function in a real-time RIC.

Turning now to FIGS. 1-6, examples are depicted with reference to one or more components and one or more methods that may perform the actions or operations described herein, where components and/or actions/operations in dashed line may be optional. Although the operations described below in FIG. 5 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example vRAN 100 connecting a user equipment (UE) 110 to a core network 160. The vRAN 100 may include radio units 120 that transmit and receive wireless signals with the UE 110. The vRAN 100 may include a virtual distributed unit (vDU) 130 that performs processing, for example, at the physical (PHY) layer, media access control (MAC) layer, and radio link control (RLC) layer. The vRAN 100 may include a virtual central unit (vCU) 140 that performs processing at higher layers of the wireless protocol stack. The vRAN 100 may include a RAN intelligent control (RIC) that performs autonomous configuration and optimization of the vRAN 100.

The division of functionality between the vDU 130 and the vCU 140 may depend on a functional split architecture. The vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer. Different components or layers may have different latency and throughput requirements. For example, the PHY layer may have latency requirements between 125 µs and 1 ms and a throughput requirement greater than 1 Gbps, the MAC and RLC layers may have latency requirements between 125 µs and 1 ms and a throughput requirement greater than 100 Mbps, and the higher layers at the vCU may have latency requirements greater than 125 μs and a throughput requirement greater than 100 Mbps.

Programmability in Open RAN components may be facilitated through a near real-time RIC 150. A network operator can install applications (Apps 152, e.g., xApps in Open RAN) on top of the near real-time RIC 150, which may collect detailed telemetry and may leverage the telemetry to optimize network performance or report issues in near real-time (e.g., >10 ms to seconds). The data collection and control of the vRAN components may be facilitated through service models that must be embedded in the vRAN functions by vendors. The service models may explicitly define the type and frequency of data reporting for each App 152, as well as a list of control policies that the RIC can use to modify the RAN behavior. Each App 152 may specify its own service model, requiring the collection of different telemetry data.

The initial xApps proposed for standardization by Open RAN focus on optimizing handovers, self-organizing network (SON) functionality, anomaly detection, and coarse grained radio resource allocation. In these use cases, significant network events occur at a low rate (100s of ms to seconds). The volume of generated telemetry data is low, and all the data are transported to the RIC. This allows Apps 152 to have a full insight into the domain and tune the vRAN functions through a pre-determined set of control policies. Unfortunately, this approach does not scale to many other use cases of RAN monitoring and control for two main reasons.

Firstly, for many lower layer applications (e.g., PHY and MAC), it is inefficient to transport all the data to the near real-time RIC 150 due to the sheer volume of data. For example, applications like localization, channel estimation, interference detection, and beamforming may require uplink IQ samples from the physical layer. Transporting all IQ samples to the RIC requires more than 5 Gbps per cell for 100 MHZ 4×4 MIMO. The standard near real-time RIC design overcomes this problem by specifying in the service model of each App the data required in terms of type and frequency (e.g., in a raw or a pre-processed format). The form of pre-processing (e.g., sub-sampling, averages, or subsets of data) greatly depends on the service model, posing a serious limitation to interoperability because vRAN vendors must implement and support each proprietary service model.

Secondly, many real-time control loops (e.g., packet scheduling and power control), have very tight time constraints (<10 ms). Such time constraints cannot be met by the standard near real-time RIC design that has an expected latency in the order of hundreds of milliseconds. As in the case of telemetry, the App choice of control policy is limited by a set of (standardized) policies that the appropriate service model of the RIC provides. vRAN vendors must implement and integrate such algorithms in their stack, while ensuring that they do not affect the run time performance of the vRAN component. This framework of services models implanted by the vRAN vendor makes it very difficult to practically implement new custom variants of tight control loops.

In an aspect, the present disclosure provides for a real-time RIC 172 that is executed on the same resources 170 (e.g., server or server rack) as the virtual radio functions (e.g., vDU 130 and vCU 140). The resources 170 include multiple processor cores, and the real-time RIC 172 is isolated from the virtual radio functions and executed on different processor core(s). The virtual radio functions are configured with codelets 176 to output selected operational data to streams and receive control information from a control stream. The real-time RIC 172 includes one or more dynamically loaded programs 174 that access the streams of operational data. For example, the dynamically loaded programs 174 may include WebAssembly (Wasm) programs, which allow flexibility for machine-learning models while also providing control over run time. The real-time RIC 172 may be configured to execute other dynamically loaded programs, which may, for example, be implemented as bytecode, containers, or virtual machines. At least one of the dynamically loaded programs 174 subscribes to a stream, performs processing on the operational data, and writes commands to the control stream. For instance, the dynamically loaded programs 174 may include applications configured to analyze the operational data. In some cases, the dynamically loaded programs 174 may make decisions for the virtual network functions, for example, by writing a command to the control stream.

Figure 2:
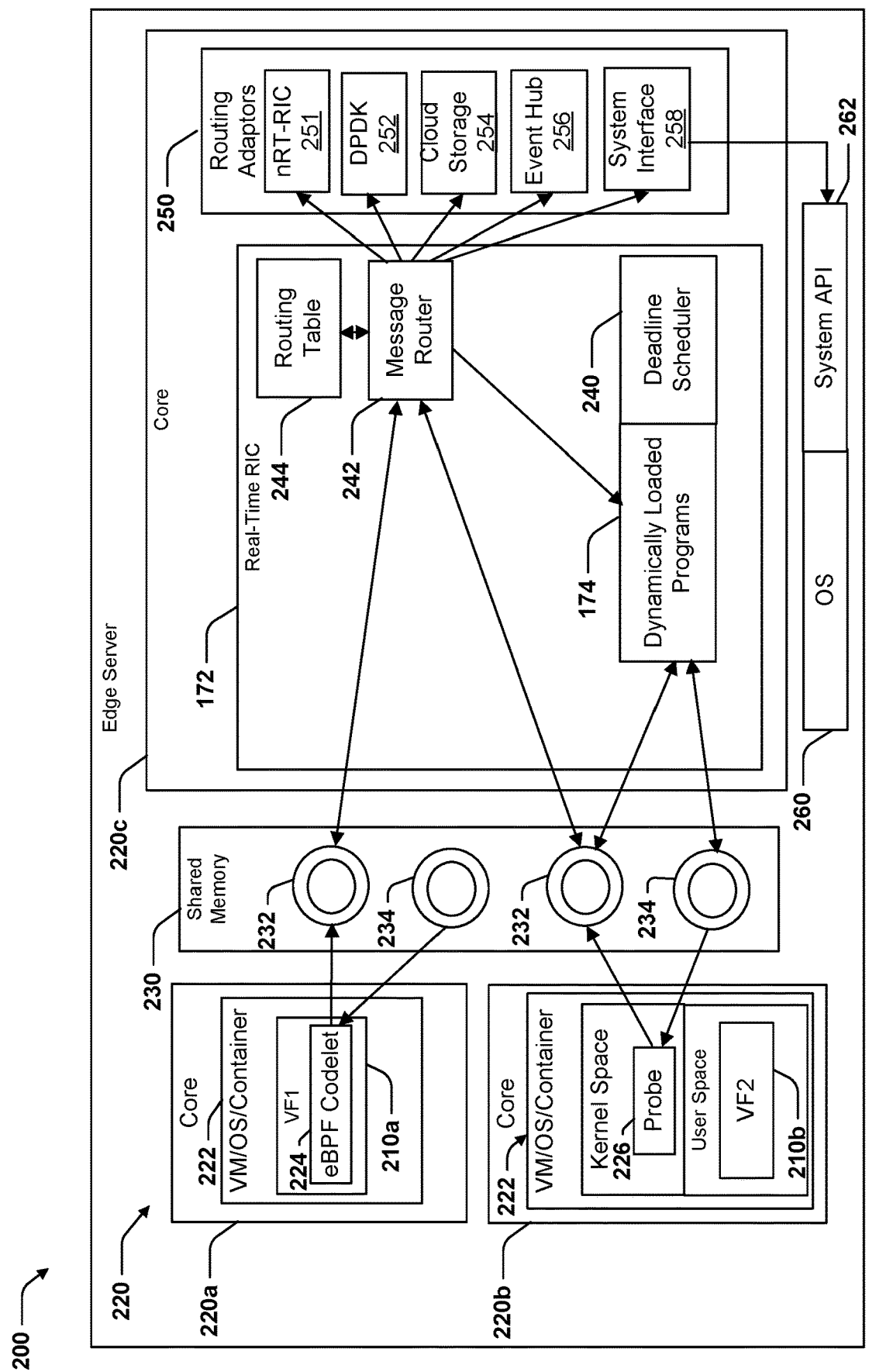
FIG. 2 is a diagram of an example edge server configured to execute virtual functions and a real-time radio intelligent controller (RIC).

FIG. 2 is a diagram of an example edge server 200 configured to execute virtual functions 210 and a real-time RIC 172. The edge server 200 may correspond to resources 170. The edge server 200 includes a plurality of processor cores 220 and may be considered a multi-core system.

A multi-core system may take advantage of multi-threaded parallel processing capabilities of multiple processor cores 220. For example, a multi-core system may include a central processing unit (CPU) such as a server grade X86 processor. The multi-core system may have one or more physical chips that provide a plurality of virtual CPUs (vCPUs). Each vCPU may be able to handle a thread of execution in parallel with the other vCPUs. In a general purpose multi-core system, an operating system may use context switching to assign different threads of execution to vCPUs as needed. In some implementations, a multi-core system may lock one or more vCPUs to certain threads of execution for virtual functions. For instance, in an implementation, a plurality of the processor cores 220 (e.g., vCPUs) may be locked to a virtual function thread of execution using a pull mode driver that occupies the processor core 220 at all times. Locking a thread of execution to a processor core 220 may reduce the overhead of context switching among threads and improve performance of the virtual function. For instance, a virtual function 210 may execute on a respective processor core 220 without interruption.

In some implementations, a virtual function 210 is executed on a core 220 within a virtual machine 222. For example, the virtual machine 222 may be referred to as a VM, operating system (OS), or container. The virtual machine 222 may include a kernel space and a user space. The virtual function 210 may execute within the user space. In an aspect, the virtual function 210 may be a proprietary third-party application provided by, for example, a vRAN vendor. Accordingly, the functionality of the virtual function 210 may be fixed with some functionality exposed via the pre-determined set of control policies and service models. In order to export operational data from a virtual function 210 or input controls to the virtual function 210, the virtual function 210 may be configured with a codelet 176. The codelet 176 is verified code that is allowed to execute within another application.

In a first implementation, the codelet 176 is an extended Berkeley packet filter (eBPF) codelet 224. The eBPF codelet 224 executes within the user space of the radio network virtual function 210a. the eBPF codelet 224 may be referred to as a user-space Berkeley packet filter (uBPF) codelet. The radio network virtual function 210 may be configured with a plurality of hooks to load eBPF bytecode to output a stream to a shared memory 230. For instance, the vRAN vendor may configure the plurality of hooks in the radio network virtual function 210a.

In a second implementation, the codelet 176 may be configured as an operating system eBPF probe 226 that executes in kernel space on the processor core 220b and exports function parameters as a stream to the shared memory 230. The operating system eBPF probe 226 may be, for example, a Linux eBPF uProbe. The operating system eBPF probe 226 may not require hooks within the virtual function 210b. Instead, the operating system eBPF probe 226 may be configured with function calls of the virtual function 210b and access the function parameters from the kernel space. Accordingly, a vRAN vendor may allow access to the operational data without modifying the virtual function 210b by providing information about the function calls.

The shared memory 230 may include one or more computer memories (e.g., RAM). The shared memory 230 may be shared between the processor cores 220 including the processor cores 220a and 220b that are assigned to the virtual functions and the processor core 220c that is configured to execute the real-time RIC 172. The codelet 176 executing on processor core 220a or 220b may write a stream 232 to the shared memory 230. The real-time RIC 172 or a dynamically loaded program 174 may write a control stream 234 to the shared memory 230. In some implementations, the shared memory 230 is configured to store streams 232, 234 in a lockless ring buffer. Accordingly, either the codelet 176 or the real-time RIC 172 may access the lockless ring buffer.

The real-time RIC 172 includes the one or more dynamically loaded programs 174. The dynamically loaded programs 174 are configured to access a stream, perform processing on the operational data, and write commands for the respective radio network virtual function to the control stream. In some implementations, a dynamically loaded program 174 may be configured to directly access the shared memory 230 to read or write to a stream 232, 234. In some implementations, the real-time RIC 172 includes a deadline scheduler 240 configured to allocate a time on the processor core 220c to execute to each of the one or more dynamically loaded programs 174. When multiple dynamically loaded programs 174 are executed within the real-time RIC 172 on the same processor core 220c, a dynamically loaded program 174 may exhibit blocking behavior that prevents another dynamically loaded program 174 from satisfying a latency requirement. The deadline scheduler 240 may configure each dynamically loaded program 174 with a deadline, at which point, context switching may occur to allow the other dynamically loaded program 174 to execute. Accordingly, the dynamically loaded programs 174 may satisfy latency requirements if they can complete execution within the allocated time. In some implementations, the deadline scheduler 240 may also apply to a message router 242 or other applications executed by the real-time RIC 172.

In some implementations, the real-time RIC 172 may include a message router 242 that is configured to access the shared memory 230 to read a stream 232, 234 and forward a message to another entity. The dynamically loaded programs may subscribe to a stream 232, 234 via the message router 242. The message router 242 may provide access to the operational data of the virtual functions 210 or results of the dynamically loaded programs 174 to entities that are not on the resources 170. For example, referring back to FIG. 1, the message router 242 may communicate with the near real-time RIC 150 and/or the core network 160. In some implementations, the message router 242 is configured with a routing table 244 that defines, for each stream, a source address and a destination address. Each address may corresponding to one of: the codelet 176, one of the dynamically loaded programs 174, or a routing adaptor 250 for an external computer system. Further details of the routing table 244 are discussed below with respect to FIG. 3.

The routing adaptors 250 may convert internal messages compatible with the codelet 176 to formats or protocols usable with external systems. In an implementation, the routing adaptors 250 include one or more of: a near rea-time RIC (nRT-RIC) adaptor 251, a data plane development kit (DPDK) adaptor 252, a cloud storage adaptor 254, an event hub adaptor 256, and a system interface adaptor 258. The nRT-RIC adaptor 251 may communicate with the near real-time RIC 150. The DPDK adaptor 252 may allow the real-time RIC 172 to send messages to another real-time RIC or associated codelet or dynamically loaded program in real time (e.g., to satisfy latency requirements). In some implementations, the DPDK adaptor 252 is configured to output operational data to a memory on a second server that is connected to the edge server 200 via a single hop network link using a DPDK function. The cloud storage adaptor 254 and the event hub adaptor 256 may communicate with cloud network applications. The system interface adaptor 258 may communicate with the operating system 260 of the edge server 200 or a system API 262. For instance, the system interface adaptor 258 may allow the real-time RIC 172 to set a CPU frequency or execute eBPF codelets.

FIG. 3 is an example of a routing table 244. The routing table 244 includes a plurality of entries 310 each corresponding to a stream with a stream ID 320. For each entry 310, the routing table 244 defines a source address 330, destination address 340, encoding field 350, and schema field 360. The source address 330 and destination address 340 may include one or more of: a codelet 176, one of the dynamically loaded programs 174, or a routing adaptor 250. In some implementations, the source address may be any source (*). For example, the entries 310a and 310b may be for the same stream ID, may apply to any source, and may have different destination addresses (e.g., an event hub via event hub adaptor 256 and an App 152 on near real time RIC 150 via nRT-RIC adaptor 251). Such entries may support multicast of operational data and/or events. For example, a codelet 176 may write to the stream ID to export operational data to multiple external systems. The encoding field 350 may indicate whether the stream is to be encoded, decoded, or neither. For example, the codelet 176 may write to the stream using a protobuf encoder defined by a protobuf schema. The encoding field 350 for entries 310a and 310b may indicate that the stream is encoded with a schema named "protobuf1" as indicated by the schema field 360. The message router 242 and/or routing adaptor 250 may use the encoding field 350 and schema field 360 to format the message for the destination. The entry 310c may define a stream from a codelet 176 to a dynamically loaded program 174 on the real-time RIC 172. For instance, the entry 310c may correspond to an output stream 232. The entry 310d may define a steam from the dynamically loaded program 174 to the codelet 176. Accordingly, the entry 310d may correspond to a control stream 234.

FIG. 4 is a diagram of an example server rack 400 implementing a real-time RIC 172 over multiple servers 200. In the example implementation, a first server 200a executes a first virtual function 210 (e.g., a vDU) and the second server 200b executes a second virtual function 210 (e.g., a vCU). Each server 200 may execute an instance of the real-time RIC 172a, 172b on a separate core (e.g., processor cores 220b, 220c). Each server 200a, 200b may include a respective memory 230a, 230b. In an implementation, the first server includes a network interface controller (NIC) 410a and the second server 200b includes a NIC 410b. The NIC 410a and NIC 410b may be connected by a direct single hop network link (e.g., Ethernet).

The second server 200b may include a dynamically loaded program 174 executing on a processor core 220d for controlling the second virtual function 210 based on operational data from the first virtual function 210. The dynamically loaded program 174 does not have direct access to the output stream 232 on memory 230a of the first server 200a. Instead, the message router 242 may read the stream 232 and forward a message from the stream 232 to the memory 230b via the DPDK adaptor 252. The DPDK adaptor 252 may invoke a DPDK function that allows the NIC 410b to write directly to the memory 230b (for example, to a copy of output stream 232). The dynamically loaded program 174 may then read the output stream 232 and write to a control stream 234 on memory 230b. Accordingly, the server rack 400 may support real-time RIC operations across multiple servers. Such an implementation may provide greater scaling and/or flexibility for allocating resources.

FIG. 5 is a flow diagram of an example of a method 500 for executing applications using operational data of a radio access network virtual function in a real-time RIC. For example, the method 500 can be performed by a server 200, server rack 400 and/or one or more components thereof to execute a dynamically loaded program 174 to control a virtual function 210.

At block 510, the method 500 includes executing a radio network virtual function on at least a first processor core. In an example, a edge server 200, e.g., in conjunction with one or more processor cores 220, memory 230, and a virtual machine 222, can execute a radio network virtual function 210 on at least a first processor core 220. The radio network virtual function 210 is configured with a codelet 176 (e.g., eBPF codelet 224 or probe 226) to output selected operational data to a first stream 232 associated with a first stream ID and receive control information from a control stream 234 associated with a second stream ID. In some implementations, at sub-block 512, the block 510 may optionally include loading the codelet 176 (e.g., eBPF codelet 224) into user space of the radio network virtual function 210 as eBPF bytecode via a plurality of hooks in the radio network virtual function 210. For example, the radio network virtual function 210 including the plurality of hooks may be provided by a third-party vRAN vendor and an operator of the server 200 may configure the radio network virtual function 210 by loading the eBPF codelet 224 onto one or more hooks to export desired operational data. In some implementations, at sub-block 514, the block 510 may optionally include execute an operating system eBPF probe 226 within kernel space on at least the first processor core 220 to export function parameters as the first stream 232. For example, the eBPF probe 226 may be executed within the kernel space of the virtual machine 222 and may reference functions of the radio network virtual function 210. In some implementations, at sub-block 516, the block 510 may optionally include outputting the first stream 232 to a memory 230 on a same server that is shared with the at least second processor core (e.g., processor core 220c).

At block 520, the method 500 may optionally populating a routing table in response to installation of a new dynamically loaded program. In an example, the real-time RIC 172. e.g., in conjunction with processor core 220c, memory 230, and operating system 260, can populating the routing table 244 in response to installation of a new dynamically loaded program 174. For example, the real-time RIC 172 may add one or more new entries 310 to the routing table 244, for example, to define a source stream and a control stream for the new dynamically loaded program 174.

At block 530, the method 500 includes executing a real time radio intelligent controller on at least a second processor core isolated from the at least the first processor core, the radio intelligent controller including one or more dynamically loaded programs. In an example, the server 200, e.g., in conjunction with processor core 220c, memory 230, and operating system 260, can execute the real-time RIC 172 on at least a second processor core (e.g. processor core 220c) isolated from the at least the first processor core (e.g., processor core 220a or 220b). The real-time RIC 172 includes one or more dynamically loaded programs 174. In some implementations, at sub-block 532, the block 530 may optionally include delivering the streams 232 based on a routing table 244 defining, for each stream, a source address 330 and a destination address 340, each address 330, 340 corresponding to one or more of: the codelet 176, one of the dynamically loaded programs 174, or a routing adaptor 250 for an external computer system. For example, the message router may deliver the stream 232 based on the routing table 244. In some implementations, the routing table 244 further defines a protobuf encoding or decoding (e.g., encoding field 350) and schema (e.g., schema field 360) for a routing adaptor 250. In some implementations, at sub-block 534, the block 530 may optionally include outputting the operational data via a DPDK function to a memory 230b on a second server 200b including a third processor core 220c configured to execute a second real-time RIC 172b. For example, the message router 242 may copy the stream 232 via a DPDK function over NICs 410a and 410b to memory 230b. In some implementations, at sub-block 536, the block 530 may optionally include allocating, by a deadline scheduler 240, a time on the at least second processor core 220c to execute to each of the one or more dynamically loaded programs 174.

At block 540, the method 500 includes accessing, by a dynamically loaded program, operational data from the first stream. In an example, the server 200 executing the dynamically loaded program 174 within the real-time RIC 172, e.g., in conjunction with processor core 220c, memory 230, and operating system 260, can access operational data from the first stream 232.

At block 550, the method 500 includes performing processing on the operational data. In an example, the server 200 executing the dynamically loaded program 174 within the real-time RIC 172, e.g., in conjunction with processor core 220c, memory 230, and operating system 260, can perform processing on the operational data. For instance, the processing may include relatively complicated processing that cannot be written in eBPF bytecode for execution within the virtual functions 210. In an example, the processing may include applying the operational data to a trained machine-learning model.

At block 560, the method 500 includes writing, by the dynamically loaded program, commands for the radio network virtual function to the control stream. In an example, the server 200 executing the dynamically loaded program 174 within the real-time RIC 172, e.g., in conjunction with processor core 220c, memory 230, and operating system 260, can write commands for the radio network virtual function 210 to the control stream 234. In some implementations, the dynamically loaded program 174 may write the commands directly to the shared memory 230. In some implementations, writing the commands may be via the message router 242, which may, for example, apply encoding or decoding as defined in the routing table 244.

Figure 6:
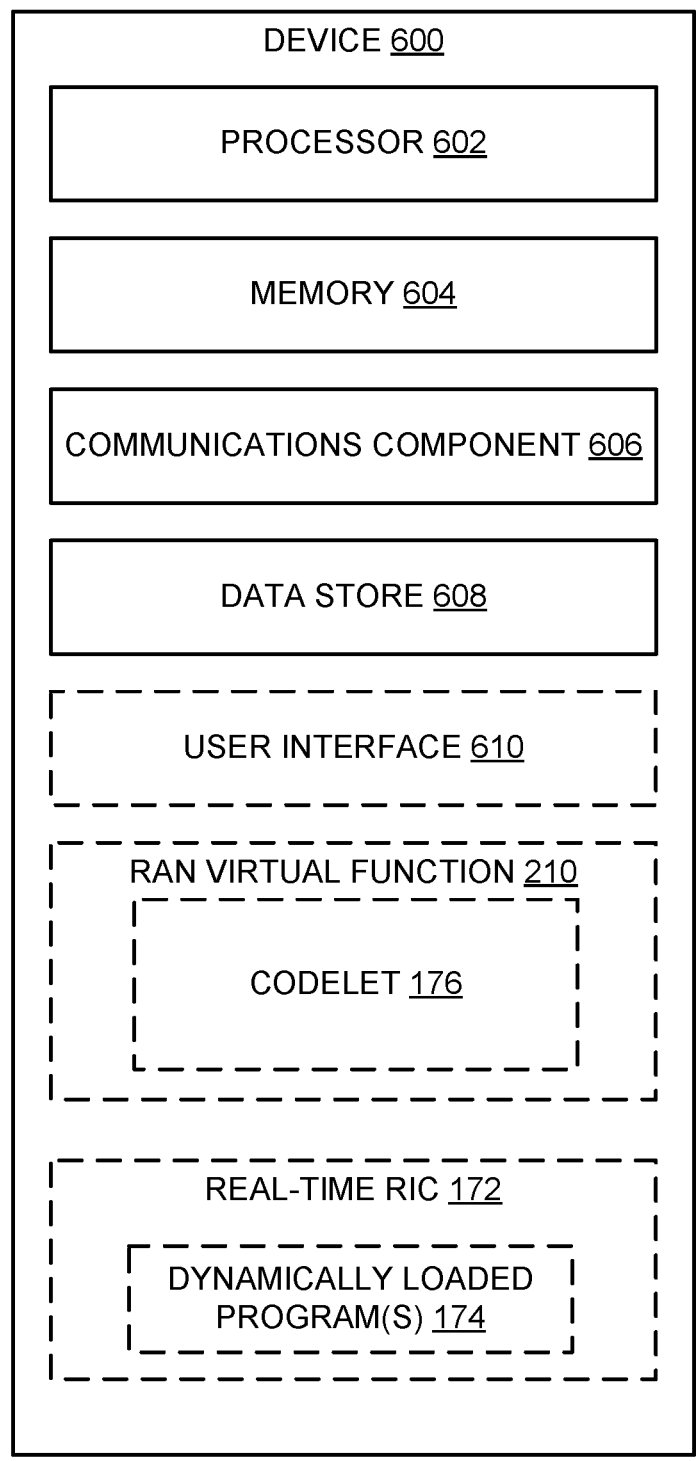
FIG. 6 illustrates an example of a device including additional optional component details as those shown in FIGS. 2 and 4.

FIG. 6 illustrates an example of a device 600 including additional optional component details as those shown in FIGS. 2 and 4. In one aspect, device 600 may include one or more processors 602, which may be similar to processor cores 220 for carrying out processing functions associated with one or more of components and functions described herein. Processor(s) 602 can include a single or multiple set of processors or multi-core processors. Moreover, processor(s) 602 can be implemented as an integrated processing system and/or a distributed processing system.

Device 600 may further include one or more memory/memories 604, which may be similar to memory 230 such as for storing local versions of operating systems (or components thereof) and/or applications being executed by processor(s) 602, such as RAN virtual functions 210 and real-time RIC 172, etc. Memory/memories 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor(s) 602. In addition, data store 608 may be a data repository for doorway RAN virtual functions 210, real-time RIC 172, and/or one or more other components of the device 600.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include the RAN virtual function 210 configured with the codelet 176 and the real-time RIC 172 for executing dynamically loaded program(s) 174, as described herein.

The following numbered clauses provide an overview of aspects of the present disclosure:

Clause 1. A computing system comprising: at least a first processor core configured to execute a radio network virtual function, wherein the radio network virtual function is configured with a codelet to output selected operational data to a first stream associated with a first stream ID and receive control information from a control stream associated with a second stream ID; and at least a second processor core configured to execute a real-time radio intelligent controller isolated from the at least the first processor core, the real-time radio intelligent controller including one or more dynamically loaded programs configured to: access the first stream; perform processing on the operational data; and write commands for the radio network virtual function to the control stream.

Clause 2. The computing system of clause 1, wherein the radio network virtual function is configured with a plurality of hooks to load the codelet into user space of the radio network virtual function as extended Berkeley Packet Filter (eBPF) bytecode to output the first stream.

Clause 3. The computing system of clause 1 or 2, wherein the radio network virtual function is configured with an operating system eBPF probe that executes in kernel space on at least the first processor core and exports function parameters as the first stream.

Clause 4. The computing system of any of clauses 1-3, wherein the codelet is configured to output the first stream to a memory on a same server that is shared with the at least second processor core.

Clause 5. The computing system of clause 4, wherein at least one of the dynamically loaded programs is configured to route a message of the first stream to a second server, the codelet, or another one of the dynamically loaded programs.

Clause 6. The computing system of clause 4 or 5, wherein the memory stores the stream as a lockless ring buffer.

Clause 7. The computing system of any of clauses 1-6, wherein the real-time radio intelligent controller includes a message router configured to deliver the streams based on a routing table defining, for each stream, a source address and a destination address, each address corresponding to one or more of: the codelet, one of the dynamically loaded programs, or a routing adaptor for an external computer system.

Clause 8. The computing system of clause 7, wherein the message router is configured to output the operational data to a memory on a second server including a third processor core configured to execute a second radio intelligent controller, wherein the second server is connected to a first server including the first processor core via a single hop network link and the output is via a data plane development kit (DPDK) function.

Clause 9. The computing system of clause 7 or 8, wherein the routing table further defines a protobuf encoding or decoding and schema for a routing adaptor.

Clause 10. The computing system of any of clauses 7-9, wherein the real-time radio intelligent controller is configured to populate the routing table in response to installation of a new dynamically loaded program.

Clause 11. The computing system of any of clauses 1-10, wherein the real-time radio intelligent controller includes a deadline scheduler configured to allocate a time on the at least second processor core to execute to each of the one or more dynamically loaded programs.

Clause 12. A method comprising: executing a radio network virtual function on at least a first processor core, wherein the radio network virtual function is configured with a codelet to output selected operational data to a first stream associated with a first stream ID and receive control information from a control stream associated with a second stream ID; executing a real time radio intelligent controller on at least a second processor core isolated from the at least the first processor core, the radio intelligent controller including one or more dynamically loaded programs; accessing, by a dynamically loaded program, operational data from the first stream; performing processing on the operational data; and writing, by the dynamically loaded program, commands for the radio network virtual function to the control stream.

Clause 13. The method of clause 12, wherein executing the radio network virtual function comprises loading the codelet into user space of the radio network virtual function as extended Berkeley Packet Filter (eBPF) bytecode via a plurality of hooks in the radio network virtual function.

Clause 14. The method of clause 12 or 13, wherein executing the radio network virtual function comprises executing an operating system eBPF probe within in kernel space on at least the first processor core to export function parameters as the first stream.

Clause 15. The method of any of clauses 12-14, wherein executing the radio network virtual function comprises outputting the first stream to a memory on a same server that is shared with the at least second processor core.

Clause 16. The method of clause 15, further comprising forwarding, by one of the dynamically loaded programs, a message of the first stream to a second server.

Clause 17. The method of clause 15 or 16, wherein the memory stores the stream as a lockless ring buffer.

Clause 18. The method of any of clauses 12-17, wherein executing the real time radio intelligent controller comprises delivering the streams based on a routing table defining, for each stream, a source address and a destination address, each address corresponding to one of: the codelet, one of the dynamically loaded programs, or a routing adaptor for an external computer system.

Clause 19. The method of clause 18, wherein executing the real time radio intelligent controller comprises outputting the operational data via a data plane development kit (DPDK) function to a memory on a second server including a third processor core configured to execute a second radio intelligent controller, wherein the second server is connected to a first server including the first processor core via a single hop network link.

Clause 20. The method of clause 18 or 19, wherein the routing table further defines a protobuf encoding or decoding and schema for a routing adaptor.

Clause 21. The method of any of clauses 18-20, further comprising populating the routing table in response to installation of a new dynamically loaded program.

Clause 22. The method of any of clauses 12-21, further comprising allocating, by a deadline scheduler, a time on the at least second processor core to execute to each of the one or more dynamically loaded programs.

One or more non-transitory computer-readable media having stored thereon compute-executable instructions that when executed by one or more processors, individually or in combination, cause the one or more processors to perform the method of any of clauses 12-22.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer readable media specifically exclude transitory signals.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A computing system comprising:
at least a first processor core configured to execute a radio network virtual function, wherein the radio network virtual function is configured with a codelet to output selected operational data to a first stream associated with a first stream ID and receive control information from a control stream associated with a second stream ID; and at least a second processor core configured to execute a real-time radio intelligent controller isolated from the at least first processor core, the real-time radio intelligent controller including one or more dynamically loaded programs, wherein the at least second processor core is configured to:

access the selected operational data from the first stream;

perform processing on the selected operational data; and write commands for the radio network virtual function to the control stream.

2. The computing system of claim 1, wherein the radio network virtual function is configured with a plurality of hooks to load the codelet into user space of the radio network virtual function as extended Berkeley Packet Filter (eBPF) bytecode.

3. The computing system of claim 1, wherein the radio network virtual function is configured with an operating system eBPF probe that exports function parameters.

4. The computing system of claim 1, wherein the radio network virtual function is configured to output the first stream including the selected operational data to a memory on a same first server, wherein the memory is shared with the at least second processor core.

5. The computing system of claim 4, wherein at least one of the one or more dynamically loaded programs is configured to route a message to a second server, the codelet, or another one of the dynamically loaded programs, wherein the second server is different than the first server.

6. The computing system of claim 4, wherein the memory stores the selected operational data to the first stream at a lockless ring buffer.

7. The computing system of claim 1, wherein the real-time radio intelligent controller includes a message router configured to deliver the first stream and the control stream based on a routing table defining, for each of a plurality of streams, a source address and a destination address, each address corresponding to one or more of: the codelet, one of the one or more dynamically loaded programs, or a routing adaptor for an external computer system.

8. The computing system of claim 7, wherein the message router is configured to output the selected operational data to a memory on a second server including a third processor core configured to execute a second radio intelligent controller, wherein the second server is connected to a first server including the at least first processor core via a single hop network link, and wherein the output of the selected operational data is via a data plane development kit (DPDK) function.

9. The computing system of claim 7, wherein the routing table further defines a protobuf encoding or decoding and schema for the routing adaptor.

10. The computing system of claim 7, wherein the real-time radio intelligent controller is configured to populate the routing table in response to installation of a new dynamically loaded program.

11. The computing system of claim 1, wherein the real-time radio intelligent controller includes a deadline scheduler configured to allocate a time on the at least second processor core to execute to each of the one or more dynamically loaded programs.

12. A method comprising:

executing a radio network virtual function on at least a first processor core, wherein the radio network virtual function is configured with a codelet to output selected operational data to a first stream associated with a first stream ID and receive control information from a control stream associated with a second stream ID;

executing a real-time radio intelligent controller on at least a second processor core isolated from the at least first processor core, the real-time radio intelligent controller including one or more dynamically loaded programs;

accessing, by a dynamically loaded program, the selected operational data from the first stream;

performing processing on the selected operational data; and writing, by the dynamically loaded program, commands for the radio network virtual function to the control stream.

13. The method of claim 12, wherein executing the radio network virtual function comprises loading the codelet into user space of the radio network virtual function as extended Berkeley Packet Filter (eBPF) bytecode via a plurality of hooks in the radio network virtual function.

14. The method of claim 12, wherein executing the radio network virtual function comprises executing an operating system eBPF probe within kernel space on the at least first processor core to export function parameters.

15. The method of claim 12, wherein executing the radio network virtual function comprises outputting the first stream including the selected operational data to a memory on a same first server, wherein the memory is shared with the at least second processor core.

16. The method of claim 15, further comprising forwarding, by one of the one or more dynamically loaded programs, a message to a second server, wherein the second server is different than the first server.

17. The method of claim 15, wherein the memory stores the selected operational data of the first stream at a lockless ring buffer.

18. The method of claim 12, wherein executing the real-time radio intelligent controller comprises delivering the first stream and the control stream based on a routing table defining, for each of a plurality of streams, a source address and a destination address, each address corresponding to one of: the codelet, one of the one or more dynamically loaded programs, or a routing adaptor for an external computer system.

19. The method of claim 18, wherein executing the real-time radio intelligent controller comprises outputting the selected operational data via a data plane development kit (DPDK) function to a memory on a second server including a third processor core configured to execute a second radio intelligent controller, wherein the second server is connected to a first server including the at least first processor core via a single hop network link.

20. The method of claim 18, wherein the routing table further defines a protobuf encoding or decoding and schema for the routing adaptor.

21. The method of claim 18, further comprising populating the routing table in response to installation of a new dynamically loaded program.

22. The method of claim 12, further comprising allocating, by a deadline scheduler, a time on the at least second processor core to execute to each of the one or more dynamically loaded programs.

23. One or more non-transitory computer-readable media having stored thereon compute-executable instructions that when executed by one or more processors, individually or in combination, cause the one or more processors to:
- execute a radio network virtual function on at least a first processor core, wherein the radio network virtual function is configured with a codelet to output selected operational data to a first stream associated with a first stream ID and receive control information from a control stream associated with a second stream ID;
- execute a real-time radio intelligent controller on at least a second processor core isolated from the at least first processor core, the real-time radio intelligent controller including one or more dynamically loaded programs;
- access, by a dynamically loaded program, the selected operational data from the first stream;
- perform processing on the selected operational data; and
- write, by the dynamically loaded program, commands for the radio network virtual function to the control stream.

* * * * *